(12) United States Patent
Heidingsfelder et al.

(10) Patent No.: US 9,359,909 B2
(45) Date of Patent: Jun. 7, 2016

(54) EXHAUST-GAS TURBOCHARGER

(75) Inventors: Leif Heidingsfelder, Ramstein (DE); Thomas Ramb, Worms (DE); Ralf Christmann, Kaiserslautern (DE); Nermin Osmanovic, Marnheim (DE)

(73) Assignee: BorgWarner Inc., Auburn Hills, MI (US)

( * ) Notice: Subject to any disclaimer, the term of this patent is extended or adjusted under 35 U.S.C. 154(b) by 555 days.

(21) Appl. No.: 13/988,799

(22) PCT Filed: Nov. 23, 2011

(86) PCT No.: PCT/US2011/061991
§ 371 (c)(1),
(2), (4) Date: May 22, 2013

(87) PCT Pub. No.: WO2012/078363
PCT Pub. Date: Jun. 14, 2012

(65) Prior Publication Data
US 2013/0243572 A1 Sep. 19, 2013

(30) Foreign Application Priority Data
Dec. 8, 2010 (DE) .......................... 10 2010 053 796

(51) Int. Cl.
*F01D 17/16* (2006.01)
*F02B 37/24* (2006.01)
*F02C 6/12* (2006.01)

(52) U.S. Cl.
CPC ............... *F01D 17/165* (2013.01); *F02B 37/24* (2013.01); *F02C 6/12* (2013.01); *Y10T 29/49236* (2015.01)

(58) Field of Classification Search
CPC ....... F01D 17/165; F01D 17/16; F01D 17/14; F01D 17/12; F01D 17/10; F01D 17/00; F04D 27/0246; F04D 29/46; F04D 29/4662
See application file for complete search history.

(56) References Cited

U.S. PATENT DOCUMENTS 4,804,316 A * 2/1989 Fleury .................. F01D 17/165
415/134

* cited by examiner

*Primary Examiner* — Richard Edgar
(74) *Attorney, Agent, or Firm* — A. Michael Tucker; Stephan A. Pendorf; Patent Central LLC

(57) ABSTRACT

An exhaust-gas turbocharger (1) having a compressor (2); a turbine (3) which has a turbine housing (4); a bearing housing (5) which has a compressor-side flange and a turbine-side flange (6); a VTG cartridge (7) which has an adjusting ring (8); and an adjusting shaft (9) which is guided through the turbine-side flange (6) of the bearing housing (5), which has an inner lever (10) which engages into the adjusting ring (8) of the VTG cartridge (7), and which has an outer lever (11, 11', 11", 11''') which is connected to an actuating element (12) of an actuator (13), wherein the outer lever (11, 11', 11", 11''') has an open rounded fastening receptacle (14) into which an associated shaft portion (15) of the adjusting shaft (9) engages.

14 Claims, 9 Drawing Sheets

EXHAUST-GAS TURBOCHARGER

The invention relates to an exhaust-gas turbocharger as per the preamble of claim 1.

Figure 13:
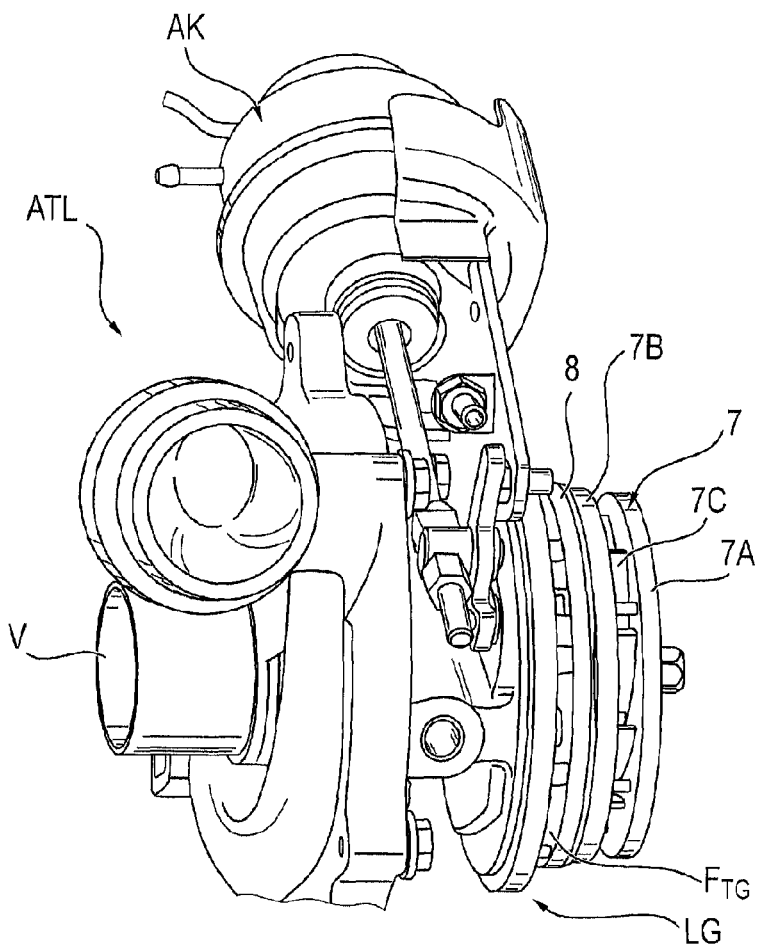
Figure 14:
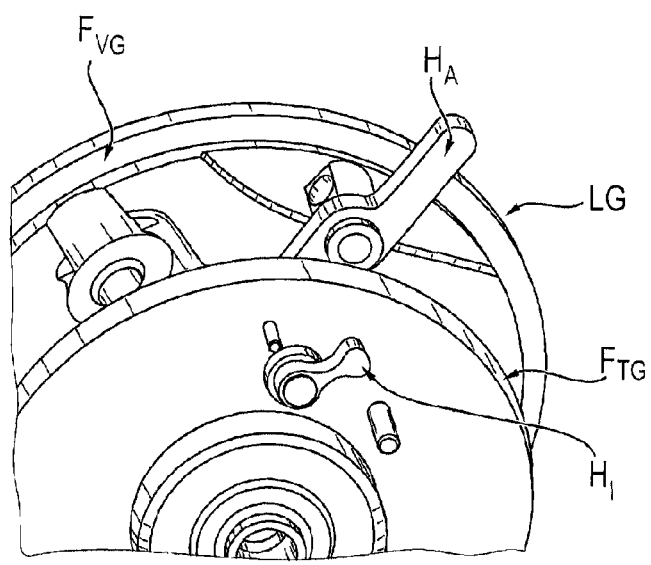

FIG. 13 shows a generic exhaust-gas turbocharger ATL in a perspective and schematically slightly simplified illustration. The exhaust-gas turbocharger ATL has, as is conventional, a compressor V and also a bearing housing LG, the latter being adjoined by a turbine with a turbine housing, which turbine is however not illustrated in FIG. 13. Arranged on a turbine-housing-side flange $F_{TG}$ is a so-called VTG cartridge 7 which has a disk 7A and a blade bearing ring 7B which delimit a space in which is arranged a multiplicity of guide blades, one of which is denoted by the reference symbol 7C. Also mounted on the blade bearing ring 7B is an adjusting ring 8 which can be actuated by means of an actuator AK (control capsule or electric actuator) in order to vary the position of the guide blades 7C according to the load state of the engine.

Figure 15:
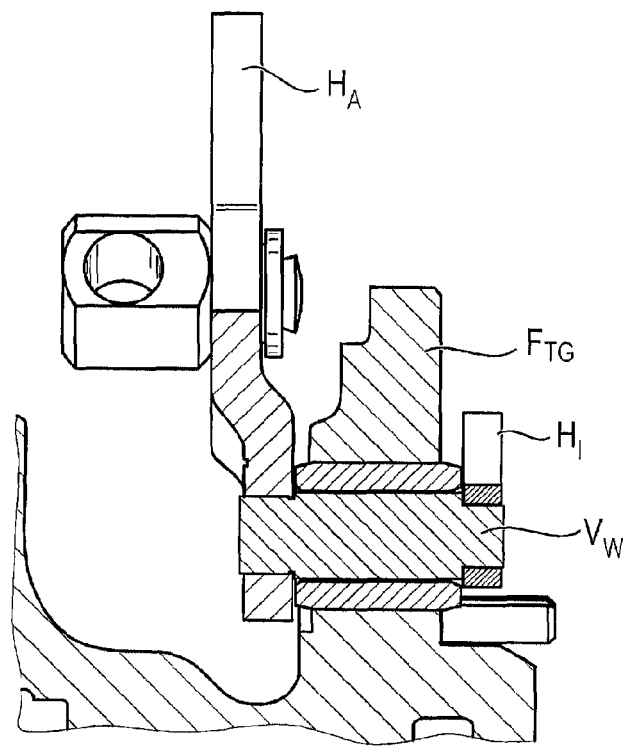

For said actuation, an adjustable adjusting shaft $V_W$, which can be seen in FIG. 15, is mounted in the turbine-housing-side flange $F_{TG}$ by means of a bush B. The adjusting shaft $V_W$ bears an inner lever $H_I$ which engages into the adjusting ring 8. Furthermore, there is fastened to the opposite end of the adjusting shaft $V_W$ an outer lever $H_A$ which is connected to an actuating member, such as for example an actuating rod, of the actuator AK in order to be able to transmit the abovementioned adjusting movement to the adjusting ring.

Figure 16:
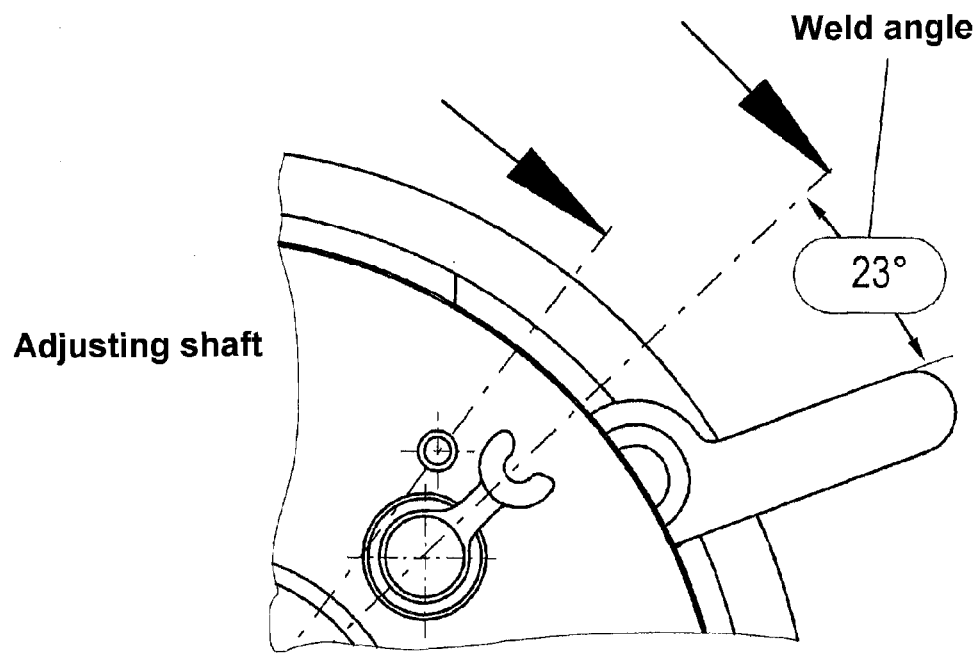

The adjusting shaft $V_W$ is conventionally welded to the outer lever $H_A$ and to the inner lever $H_I$ before the assembly of the turbocharger ATL, resulting in a defined weld angle between the levers, said angle being specified in FIG. 16 by way of example as being 23°.

In the generic exhaust-gas turbocharger ATL, however, it is not possible in the assembled state of the exhaust-gas turbocharger ATL to adjust the VTG cartridge 7 to a defined stop point and to thus find the correct weld angle for setting the actuator AK.

It is therefore an object of the present invention to provide an exhaust-gas turbocharger of the type specified in the preamble of claim 1, by means of which it is possible to adjust the VTG cartridge to the abovementioned defined stop point, and to thus exactly find the correct weld angle for setting the control capsule, in the assembled state of the exhaust-gas turbocharger.

Said object is achieved by means of the features of claim 1.

By means of the design according to the invention, it is possible for the adjusting shaft to initially be provided with the inner lever and to be inserted into a turbine-side flange of the bearing housing. The exhaust-gas turbocharger can then be fully assembled with the exception of the fastening of the outer lever to the adjusting shaft. The open rounded fastening receptacle of the outer lever can then be placed onto an associated shaft portion of the adjusting shaft. It is thereby possible in the assembled state of the exhaust-gas turbocharger to adjust the VTG cartridge to a defined stop point and thus find the correct weld angle for setting the actuator. This is because, after the VTG cartridge has been placed into a stop position and the actuator, in particular the control capsule, has been positioned by means of a corresponding control pressure, the outer lever can be radially fixedly connected, in particular welded, to the adjusting shaft.

This yields the advantage that the outer lever can serve not only for the radial guidance of the adjusting shaft but also for the axial guidance, and therefore forms a stop with the bush in which the adjusting shaft is guided in the turbine-housing-side flange of the bearing housing.

Subclaims 2 to 9 disclose advantageous refinements of the exhaust-gas turbocharger according to the invention.

If the outer lever is provided with a cranked portion, this yields the advantage that the axial installation space of the actuator, in particular of the capsule, is not restricted.

With regard to the recognition of the generic prior art on the basis of FIG. 13, it is pointed out that the VTG cartridge 7 illustrated in said figure with its components 7A to 7C and 8 are used in an exhaust-gas turbocharger according to the invention.

The invention also relates to a method for mounting an adjusting shaft for a VTG cartridge of an exhaust-gas turbocharger which, aside from a compressor and a bearing housing, has a turbine.

Figure 19:
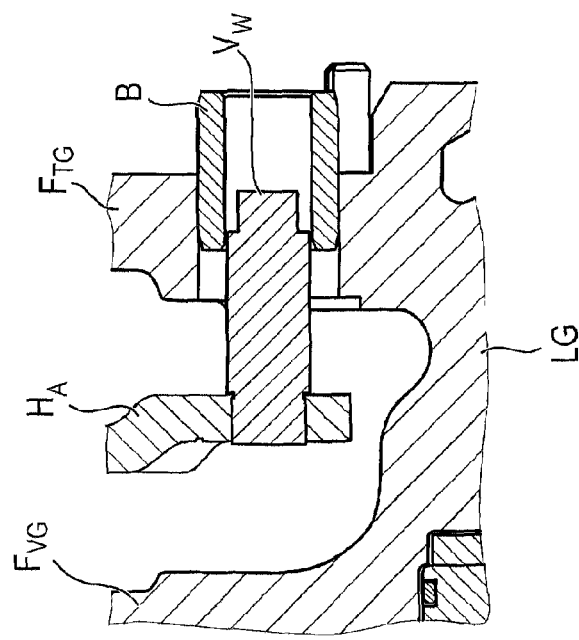
Figure 18:
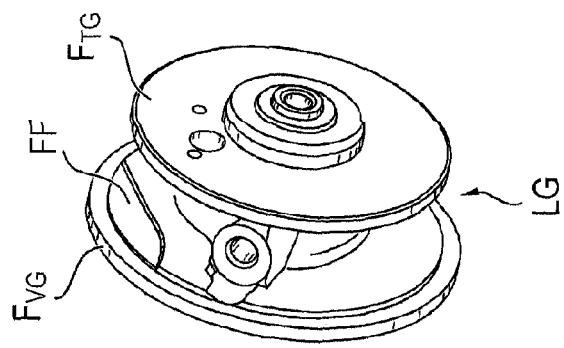
Figure 17:
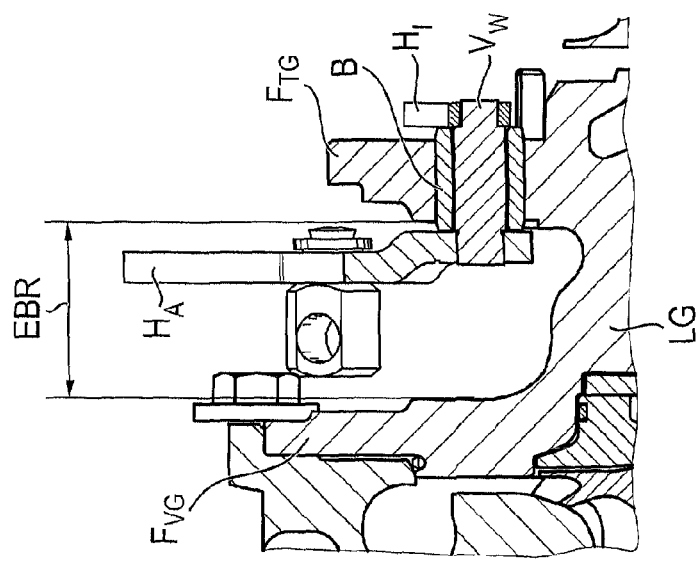

In this regard, reference is initially made to the illustration of FIGS. 17 to 19, which illustrate the prior art.

FIG. 17 firstly shows that, in particular in the case of relatively small exhaust-gas turbocharger structural sizes, the installation space EBR indicated there between the compressor-side flange $F_{VG}$ and the turbine-side flange $F_{TG}$ of the bearing housing LG is very limited. As a result, a milled clearance FF is required on the compressor-side flange $F_{VG}$, and the adjusting shaft bush mounting must be carried out in two stages. As per the illustration of FIG. 19, in a first step, the bush B of the turbine-housing-side flange $F_{TG}$ of the bearing housing LG is only partially pressed in, such that the adjusting shaft which is provided with the outer lever can be inserted into the bush B. In the second step, the bush B is then pressed into the end position, and thereafter, the inner lever is welded to that end of the adjusting shaft VW that is guided through the bush B. A retroactive setting of the cartridge is therefore no longer possible after the assembly of the exhaust-gas turbocharger.

It is therefore also an object of the present invention to provide a method for mounting an adjusting shaft for a VTG cartridge of an exhaust-gas turbocharger, which method is simpler to carry out and whose reliability is accordingly increased.

Said object is achieved by means of the features of claim 10.

An advantage of the method according to the invention emerges during the mounting of the adjusting shaft, because said adjusting shaft can be inserted into the bush of the turbine-side bearing housing flange from the turbine side after the attachment of the inner lever, and as a result, a piston ring which may optionally be provided can be pressed in significantly more easily.

In relation to the known method, the assembly space on the turbine side is not limited, resulting in adequate free space for automated or manual mounting, as a result of which reliability is increased.

Furthermore, as a result of the radial connection of the outer lever to the free end of the adjusting shaft, the space between the bearing housing flanges can be better utilized, as a result of which it is possible to dispense with the milled clearance 18 in the bearing housing, as explained on the basis of FIG. 18, and the two-stage pressing-in of the bush. This yields a considerable simplification of the mounting process.

A further advantage of the method according to the invention emerges from the fact that the structural unit composed of adjusting shaft and inner lever can be formed identically as a standard component for all structural sizes, while only the outer lever need be designed in a customer-specific manner. Subclaims 11 to 14 relate to advantageous refinements of the method according to the invention.

The outer lever, which is of customer-specific design, may advantageously be a sheet-metal structure which is cheap to manufacture and easy to weld. Likewise, the outer lever may be provided with a compensating ball in order to provide axial compensation of the control capsule play.

Figure 1:
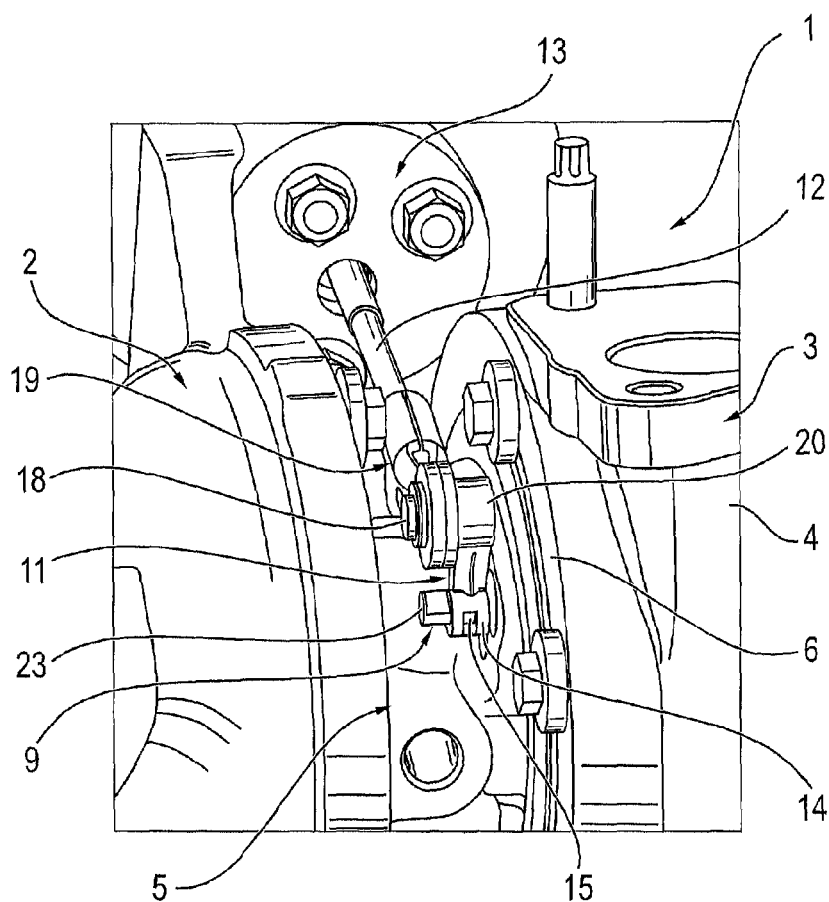
Figure 2:
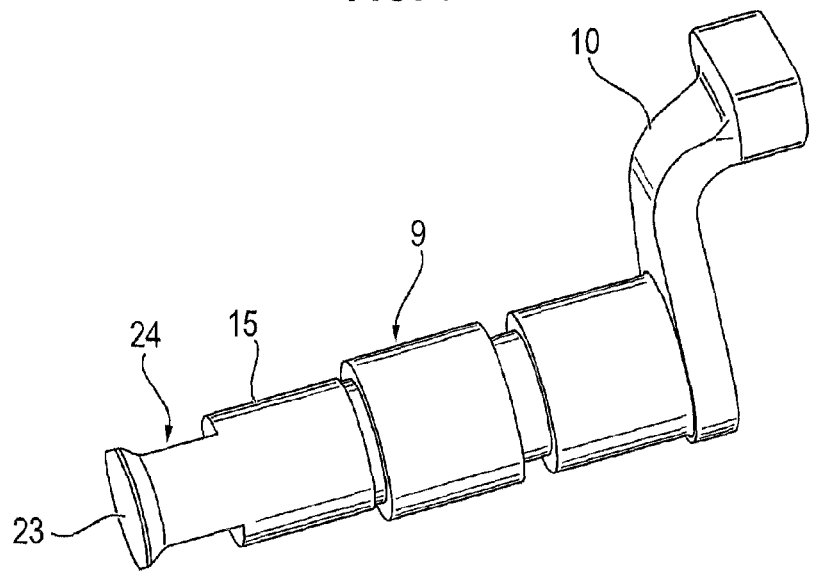
Figure 3:
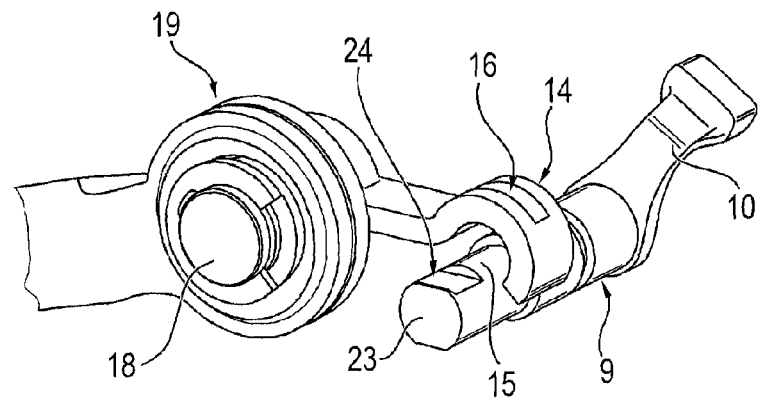
Figure 4:
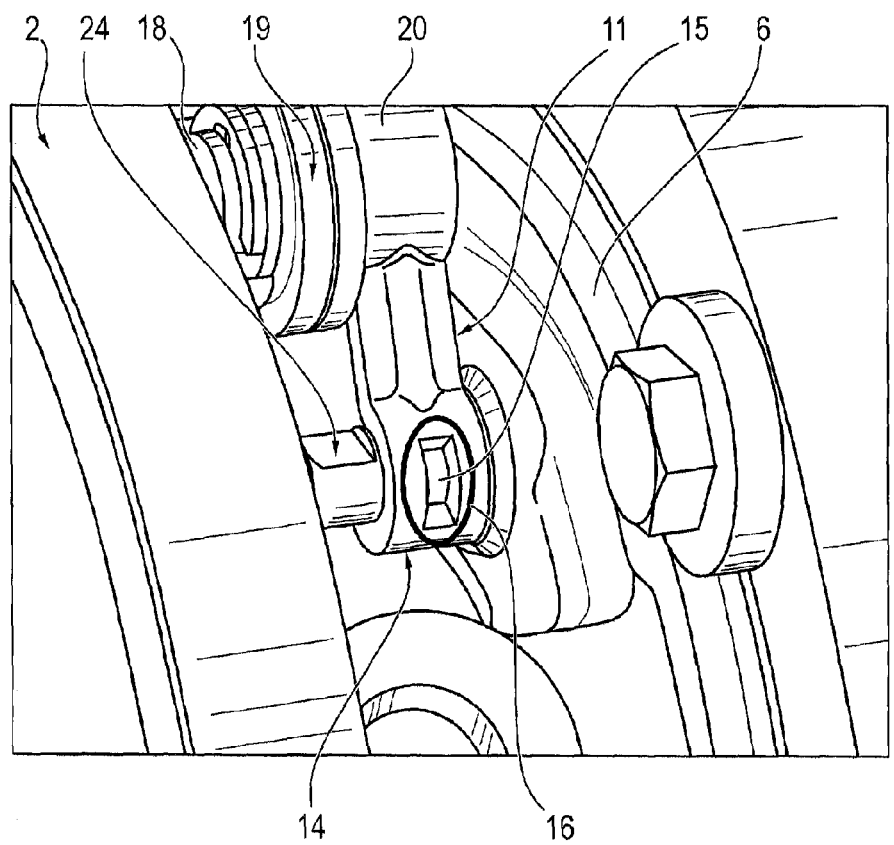
Figure 5:
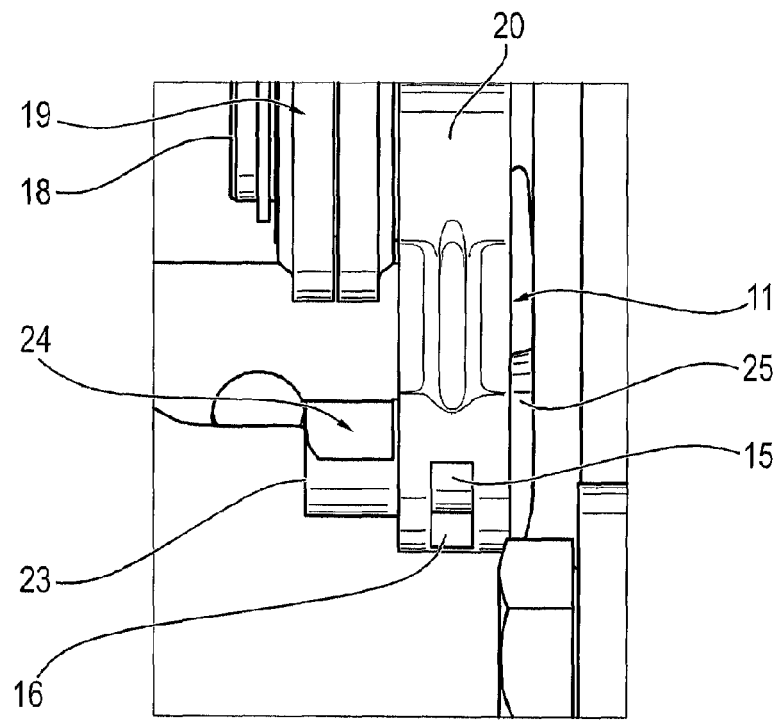
Figure 6:
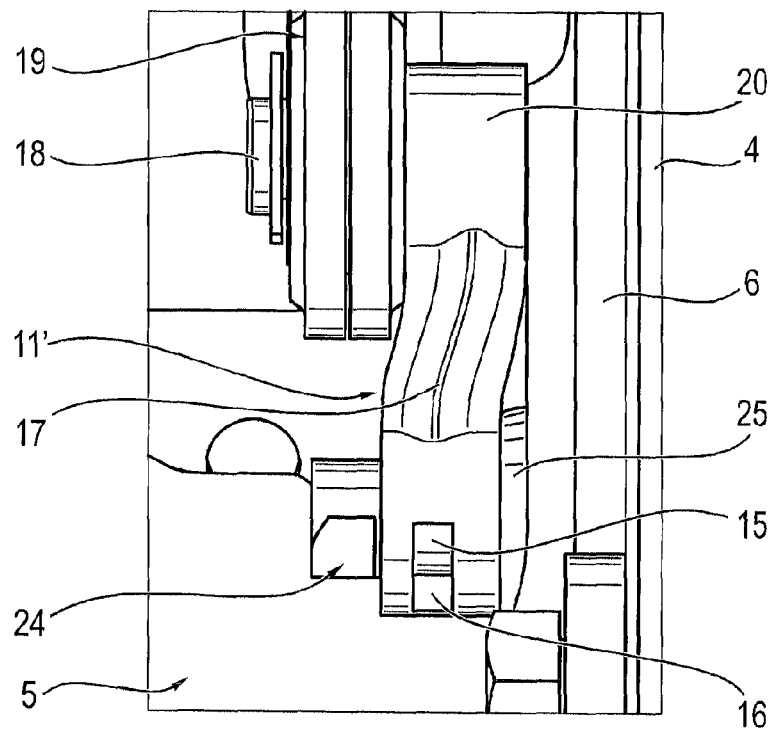
Figure 7:
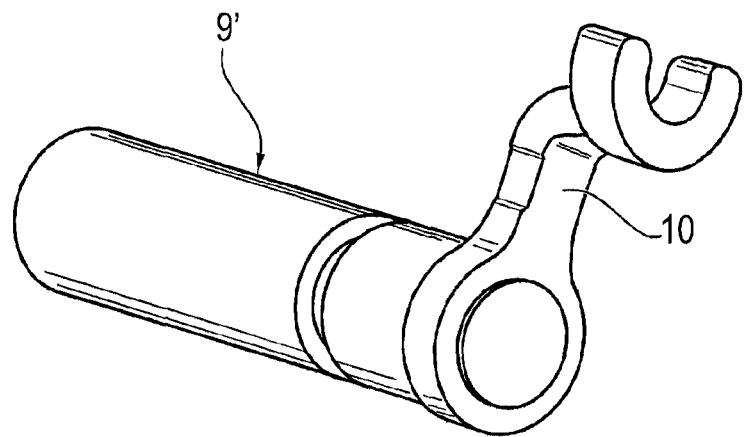
Figure 8:
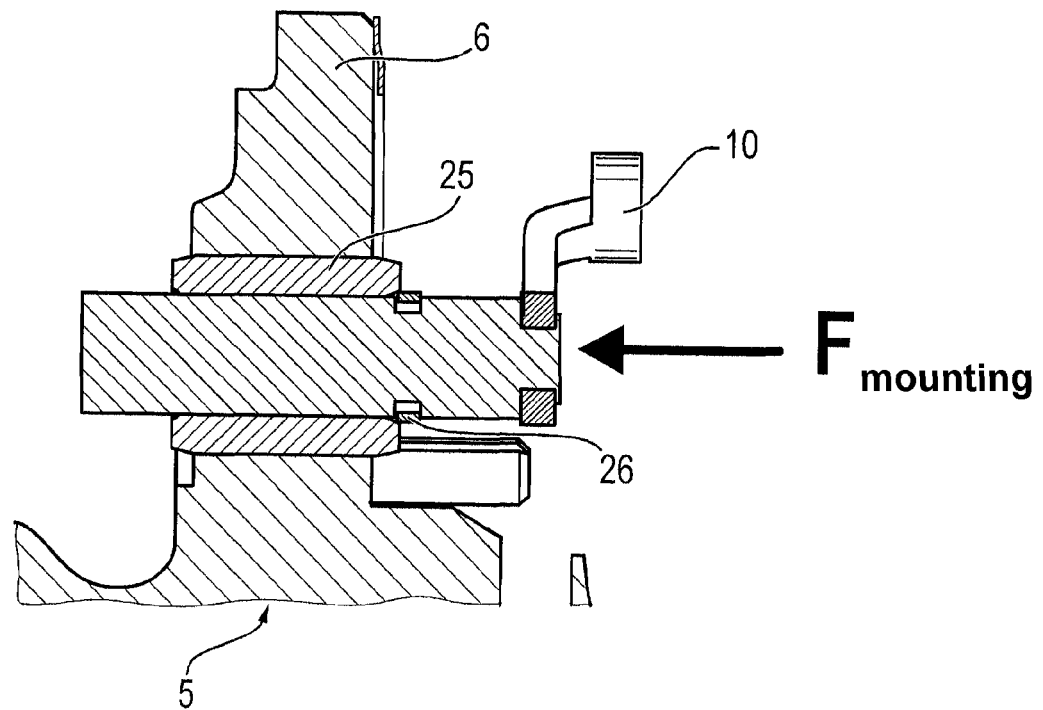
Figure 9:
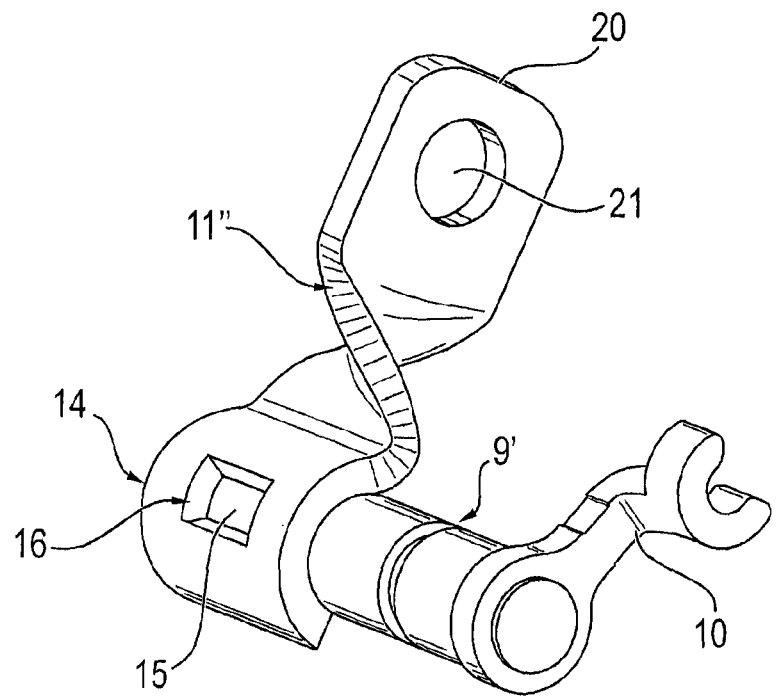
Figure 10:
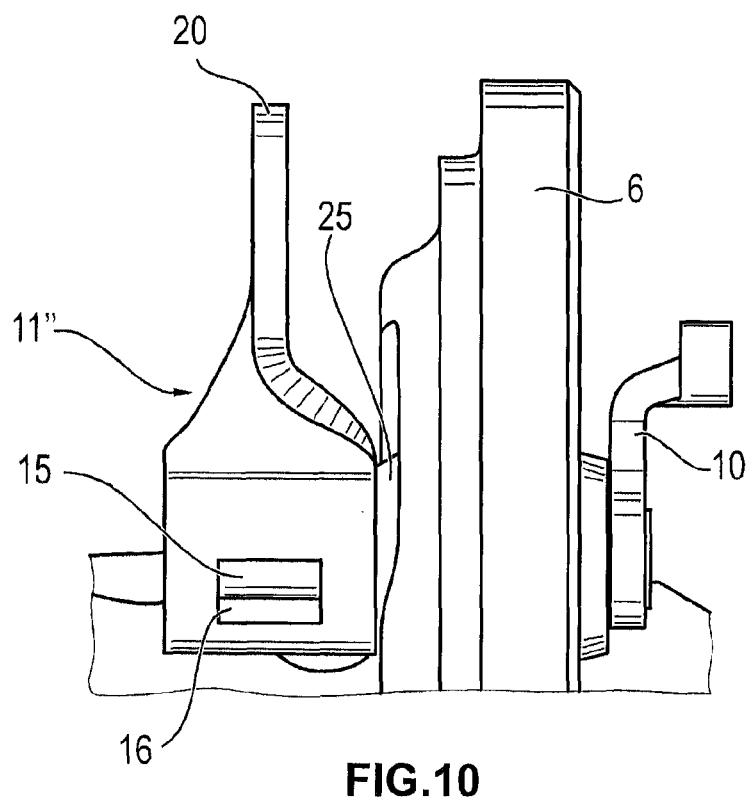
Figure 11:
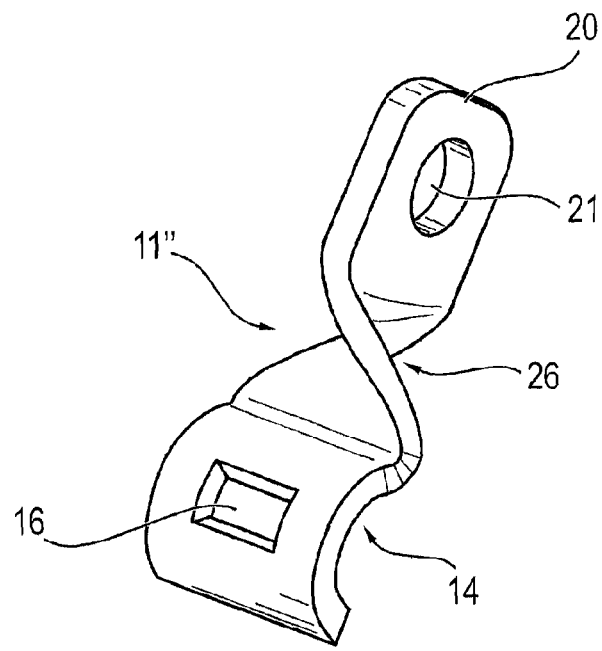
Figure 12:
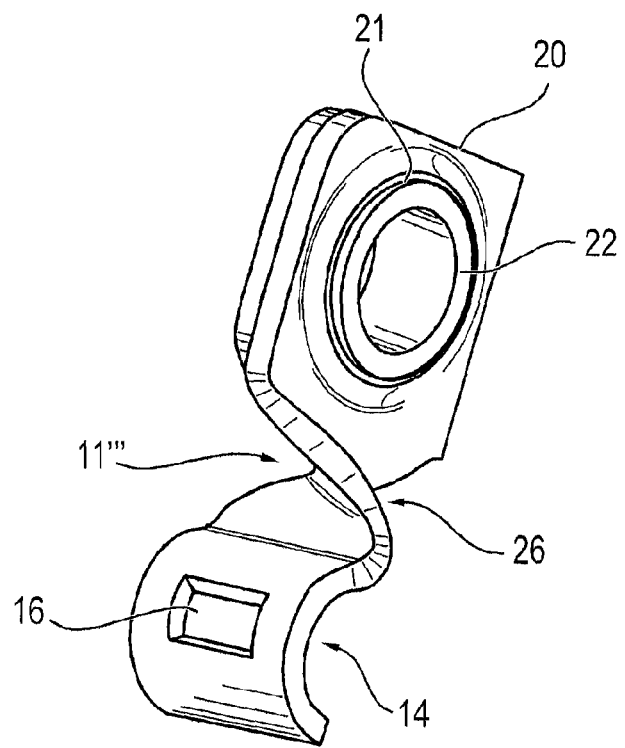

Further details, features and advantages of the invention will emerge from the following description of exemplary embodiments on the basis of the drawing, in which:

FIG. 1 shows a partially perspective illustration of an embodiment of the exhaust-gas turbocharger according to the invention, FIG. 2 shows a perspective illustration of an adjusting shaft of the exhaust-gas turbocharger, FIG. 3 shows an illustration, corresponding to FIG. 2, of the adjusting shaft and of an outer lever before the assembly of said components, FIG. 4 shows a perspective plan view of the adjusting shaft and the outer lever after the connection of said components, FIG. 5 shows a front view of the outer lever and of the adjusting shaft after the connection, FIG. 6 shows an illustration, corresponding to FIG. 5, with an alternative embodiment of the outer lever, FIG. 7 shows an illustration, corresponding to FIG. 2, of a second embodiment of the adjusting shaft, FIG. 8 shows an illustration of the adjusting shaft as per FIG. 7 in the mounted state in a bush of a bearing housing flange, FIG. 9 shows a perspective illustration of the adjusting shaft as per FIG. 7 with the outer lever mounted, FIG. 10 shows a front view of the arrangement as per FIG. 9, FIG. 11 shows a perspective illustration of a further embodiment of the outer lever, FIG. 12 shows an illustration, corresponding to FIG. 11, of the outer lever with a compensating ball, and FIGS. 13 to 19 show illustrations of a known exhaust-gas turbocharger and its components for explaining the prior art.

FIG. 1 shows an exhaust-gas turbocharger 1 according to the invention in a partial view. The exhaust-gas turbocharger 1 has a compressor 2 and a turbine 3, said turbine having a turbine housing 4 in which is arranged a turbine wheel (not visible in the figures).

Arranged between the housing of the compressor 2 and the turbine housing is a bearing housing 5 which has a compressor-side flange (not visible in FIG. 1 owing to the selected illustration) and a visible turbine-side flange 6.

Since the illustrated exhaust-gas turbocharger 1 is a charger having a variable turbine geometry which corresponds in design to known arrangements, reference may be made, with regard to said parts (not visible in FIG. 1 because they are arranged in the turbine housing 4), to the explanations made regarding FIG. 13 (parts 7, 7A, 7B, 7C, 8 therein).

The exhaust-gas turbocharger also has an adjusting shaft 9 which is guided through the turbine-side flange 6 of the bearing housing 5. Owing to the illustration selected in FIG. 1, the only visible parts of said adjusting shaft 9 are the free end 23 and a shaft portion 15, such that with regard to the overall illustration of the adjusting shaft 9, reference may be made in particular to FIG. 2.

It can be seen in particular from a juxtaposition of FIGS. 1 to 5 that the adjusting shaft 9 has an inner lever which engages into the adjusting ring 8, illustrated in FIG. 13, of the VTG cartridge 7.

Furthermore, the adjusting shaft 9 has an outer lever 11 which is visible in FIGS. 1, 3, 4 and 5. Said outer lever 11 is connected to an actuating element 12 of an actuator 13 (control capsule or electric actuator), as can be seen from FIG. 1.

It can be seen in particular from a juxtaposition of FIGS. 3 to 5 that the outer lever 11 has an open rounded fastening receptacle 14. Here, it is shown in particular in FIG. 3 that an "open and rounded" fastening receptacle 14 is to be understood to mean a configuration which is of substantially semicircular design and which forms a type of hook, wherein the rounded region is matched in terms of form and dimensions to a shaft portion 15 of the adjusting shaft 9, which shaft portion is engaged around by the open rounded fastening receptacle 14, in which regard reference is made in particular to a juxtaposition of FIGS. 3 to 5. Said design of the outer lever 11 permits complete pre-assembly of the exhaust-gas turbocharger 1 and therefore improved setting capability for the actuator 13, because after the assembly, the VTG cartridge can be placed into a stop position, for which purpose the free end 23 of the adjusting shaft 9 has a tool receptacle 24. The tool receptacle 24 is formed in the example as a dihedron which may be engaged for example by an open-ended wrench, such that it is made possible for the adjusting shaft 9 to be rotated, and therefore the VTG cartridge and the actuator 13 to be set, in the assembled state of the exhaust-gas turbocharger 1.

For the final fastening of the outer lever 11 or the fastening receptacle 14 thereof to the shaft portion 15, the fastening receptacle 14 has a passage recess 16 which can be seen in particular in FIG. 4, in which said passage recess 16 is outlined by an oval line. The illustration shows that the passage recess 16 extends all the way through the material thickness in the region of the fastening receptacle 14 in which the passage recess 16 is arranged, such that the shaft portion 15 exposed by the passage recess (window) 16 is visible in FIG. 1, FIG. 4 and FIG. 5. For the final fastening, the fastening receptacle 14 can be connected to the shaft portion by means of a welded connection in said passage recess 16.

In the embodiment according to FIGS. 1 to 5 and 6, at that end 20 of the outer lever 11 which is arranged opposite the fastening receptacle 14, there is provided a peg 18 which engages into a connecting device 19 of the actuating element (actuating rod) 12 in order to operatively connect the actuator 13 to the VTG cartridge.

Since the connection, in particular welding, of the fastening receptacle 14 to the shaft portion 15 may take place radially from the outside, this yields a significant simplification of the assembly in relation to known approaches, because despite the relatively small spacing between the compressor-side flange and the turbine-side flange of the bearing housing 5, the passage recess 16 and the shaft portion 15 are easily accessible radially from the outside.

The embodiment according to FIG. 6 substantially corresponds to that of FIGS. 1 to 5, such that the same reference numerals are used for all corresponding parts. In the embodiment according to FIG. 6, the outer lever 11' is however provided with a cranked portion 17, the purpose of which is to ensure that the axial installation space of the actuator or control capsule 13 is not restricted. Furthermore, it is clear from FIG. 6 and also from FIG. 5 that the outer lever 11 serves not only for the radial guidance of the adjusting shaft 9 but also for the axial guidance, and therefore forms a stop with the bush 25 which is arranged in the turbine-housing-side flange 6 and which guides the adjusting shaft 9.

The method according to the invention will be explained in detail below on the basis of FIGS. 7 to 12.

As can be seen from FIG. 7, firstly the inner lever 10 is connected, in particular welded, to the adjusting shaft 9'.

The component composed of adjusting shaft 9' and inner lever 10 fixed thereto is inserted into the bush 25 of the turbine-housing-side flange 6 of the bearing housing 5 in the direction of the arrow $F_{mounting}$ in FIG. 8, wherein a sealing ring 26 is optionally attached to the adjusting shaft 9' beforehand.

According to FIGS. 9 and 10, the outer lever 11' is then placed with its fastening receptacle 14, which is open at one side and of rounded form, onto the associated shaft portion 15 of the adjusting shaft 9'. With regard to FIG. 9, it is pointed out in this regard that, in this illustration, the turbine-housing-side flange 6 has been omitted in order to be able to clarify in a perspective illustration how the fastening receptacle 14, which is open at one side and of rounded form, of the outer lever 11' rests on or nestles against the associated shaft portion 15, because the inner circumferential surface of the fastening receptacle 14 is matched in terms of dimensions and shape to said shaft portion 15.

As already described above, FIGS. 9 and 10 likewise illustrate the passage recess 16 which makes it possible for the fastening receptacle 14 to be welded to the shaft portion 15 in the radial direction likewise already explained above, which significantly simplifies assembly owing to the considerably improved accessibility in relation to the prior art.

FIGS. 11 and 12 again illustrate the outer lever 11' which, in this case, is provided at its end 20 arranged opposite the fastening receptacle 14 with a fastening recess 21 into which can be inserted a correspondingly formed counterpart of the actuating element 12 of the actuator 13.

In the particularly preferred embodiment illustrated in FIG. 12, said fastening recess or said fastening lug 21 is furthermore provided with a compensating ball 22.

As shown in FIGS. 11 and 12, both embodiments of the outer lever 11" and 11'" have a central portion 26 formed as a result of twisting of the lever material.

To supplement the disclosure, in addition to the above written disclosure of the invention, reference is hereby explicitly made to the diagrammatic illustration in FIGS. 1 to 13.

LIST OF REFERENCE NUMERALS

1 Exhaust-gas turbocharger
2 Compressor
3 Turbine
4 Turbine housing
5 Bearing housing
6 Turbine-side flange
7 VTG cartridge (cartridge of the variable turbine geometry VTG)
7A Disk
7B Blade bearing ring
7C Guide blades
8 Adjusting ring
9, 9' Adjusting shaft
10 Inner lever
11, 11', 11", 11'" Outer lever
12 Actuating element (actuating rod)
13 Actuator
14 Fastening receptacle
15 Shaft portion
16 Passage recess
17 Cranked portion
18 Peg
19 Connecting device
20 End, arranged opposite the fastening receptacle 14, of the outer lever
21 Fastening recess/fastening lug
22 Compensating ball
23 Free end
24 Tool receptacle
25 Bush
26 Central region
$H_A$ Outer lever
$H_I$ Inner lever
$F_{TG}$ Turbine-housing-side flange
$V_W$ Adjusting shaft
EBR Installation space
$F_{VG}$ Compressor-housing-side flange
B Bush
LG Bearing housing
FF Milled clearance C

The invention claimed is:

1. An exhaust-gas turbocharger (1) comprising:
a compressor (2);
a turbine (3) having a turbine housing (4);
a bearing housing (5) having a compressor-side flange and a turbine-side flange (6);
a VTG cartridge (7) having an adjusting ring (8); and
an adjusting shaft (9) which is guided through the turbine-side flange (6) of the bearing housing (5), which has an inner lever (10) which engages into the adjusting ring (8) of the VTG cartridge (7), and which has an outer lever (11, 11', 11", 11'") which is connected to an actuating element (12) of an actuator (13), wherein
the outer lever (11, 11', 11", 11'") has an open rounded fastening receptacle (14) into which an associated shaft portion (15) of the adjusting shaft (9) engages.

2. The exhaust-gas turbocharger as claimed in claim 1, wherein the fastening receptacle (14) and the shaft portion (15) are welded.

3. The exhaust-gas turbocharger as claimed in claim 1, wherein the fastening receptacle (14) has a passage recess (16).

4. The exhaust-gas turbocharger as claimed in claim 1, wherein the outer lever (11') is provided with a cranked portion (17).

5. The exhaust-gas turbocharger as claimed in claim 1, wherein the outer lever (11, 11') is provided, at its end (20) arranged opposite the fastening receptacle (14), with a peg (18) which engages into a connecting device (19) of the actuating element (12).

6. The exhaust-gas turbocharger as claimed in claim 1, wherein the outer lever (11", 11'") is provided, at its end (20) arranged opposite the fastening receptacle (14), with a fastening lug (21).

7. The exhaust-gas turbocharger as claimed in claim 6, wherein a compensating ball (22) is arranged in the fastening lug (21).

8. The exhaust-gas turbocharger as claimed in claim 1, wherein the adjusting shaft (9) is provided, at its free end (23) arranged adjacent to the shaft portion (15), with a tool receptacle (24).

9. The exhaust-gas turbocharger as claimed in claim 8, wherein the tool receptacle (24) is formed as a dihedron.

10. A method for mounting an adjusting shaft (9, 9') for a VTG cartridge (7) of an exhaust-gas turbocharger (1) which has a turbine (3), having the following method steps:
connecting an inner lever (10) to one end of the adjusting shaft (9, 9');
inserting the adjusting shaft (9, 9') from the turbine side of the exhaust-gas turbocharger (1) into a bearing bush (25) of a turbine-side flange (6) of a bearing housing (5) of the exhaust-gas turbocharger (1);
placing an open rounded fastening receptacle (14) of an outer lever (11, 11', 11", 11'") onto an associated shaft region (15) of the adjusting shaft (9, 9'); and radially connecting the fastening receptacle (14) to the shaft portion (15).

11. The method as claimed in claim 10, wherein the connection of the fastening receptacle (14) and shaft portion (15) takes place by means of welding.

12. The method as claimed in claim 10, wherein the connection of the fastening receptacle (14) and shaft portion (15) takes place through a passage recess (16) formed into the fastening receptacle (14).

13. The method as claimed in claim 10, wherein a free end (23) of the adjusting shaft (9) is provided with a tool receptacle (24) for setting a defined position before connection takes place.

14. The method as claimed in claim 13, wherein the tool receptacle (24) is formed as a dihedron.

\* \* \* \* \*